(12) United States Patent
Tian et al.

(10) Patent No.: US 12,445,850 B2
(45) Date of Patent: Oct. 14, 2025

(54) SYSTEMS AND METHODS TO DETECT GPS SPOOFING ATTACKS

(71) Applicant: Intelligent Fusion Technology, Inc., Germantown, MD (US)

(72) Inventors: Xin Tian, Germantown, MD (US); Zhengyang Fan, Germantown, MD (US); Khanh Pham, Albuquerque, NM (US); Erik Blasch, Arlington, VA (US); Sixiao Wei, Germantown, MD (US); Dan Shen, Germantown, MD (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 123 days.

(21) Appl. No.: 18/397,610

(22) Filed: Dec. 27, 2023

(65) Prior Publication Data

US 2025/0220432 A1    Jul. 3, 2025

(51) Int. Cl.
*H04L 29/06* (2006.01)
*H04W 12/121* (2021.01)

(52) U.S. Cl.
CPC ............... *H04W 12/121* (2021.01)

(58) Field of Classification Search
CPC ............................................. H04W 12/121
See application file for complete search history.

(56) References Cited

U.S. PATENT DOCUMENTS

2023/0018948 A1* 1/2023 Ding .................. G06F 21/54
2024/0311685 A1* 9/2024 Rawal ................ G06N 5/045

\* cited by examiner

*Primary Examiner* — Wasika Nipa
(74) *Attorney, Agent, or Firm* — ANOVA LAW GROUP, PLLC (57) ABSTRACT

A method for detecting GPS spoofing attacks includes providing a trained deep learning (DL) model based on neural networks, feeding GPS signals into the trained DL model, using asymmetric Shapley values (ASVs) to calculate feature contributions, using the ASVs to assign a non-uniform distribution over an ordering of features, obtaining causal structures among the features, applying the ASVs to causal Shapley additive explanation to obtain Shapley attributions, incorporating the Shapley attributions and the causal structures, and detecting GPS spoofing attacks by running the trained DL model and using the causal structures, non-uniform distribution, feature contributions, and Shapley attributions.

11 Claims, 4 Drawing Sheets

SYSTEMS AND METHODS TO DETECT GPS SPOOFING ATTACKS

GOVERNMENT RIGHTS

This invention was made with Government support under Contract No. FA9453-22-P-A003, awarded by the Air Force Research Laboratory of the United States Department of Defense. The U.S. Government has certain rights in the present disclosure.

TECHNICAL FIELD

The present disclosure generally relates to the field of spoofing attack detection and, more particularly, relates to the detection of global positioning system (GPS) spoofing attacks using machine learning methods.

BACKGROUND

GPS has become ubiquitous in positioning and navigation applications. As GPS signals are transmitted with low power, GPS receivers are very sensitive and vulnerable to spoofing attacks. GPS spoofing involves the transmission of forged GPS-like signals to deceive receivers. These attacks can cause generation of a false position of the receiver without disrupting GPS operation, and compromise systems such as unmanned aerial vehicles (UAVs), autonomous vehicles, and maritime navigation systems, posing serious implications for security and safety. While some machine learning methods are used to detect GPS spoofing attacks, they often lack interpretability, bringing uncertainty about the reasons for classifying a signal as spoofed. Furthermore, causal relationships among relevant features are overlooked, which hinders analysis and strategies to detect and mitigate the effects of spoofing attacks.

The disclosed systems and methods are directed to solve one or more problems set forth above and other problems.

BRIEF SUMMARY OF THE DISCLOSURE

In one aspect of the present disclosure, a method for detecting GPS spoofing attacks includes providing a trained deep learning (DL) model based on neural networks, feeding GPS signals into the trained DL model, using asymmetric Shapley values (ASVs) to calculate feature contributions, using the ASVs to assign a non-uniform distribution over an ordering of features, obtaining causal structures among the features, applying the ASVs to causal Shapley additive explanation to obtain Shapley attributions, incorporating the Shapley attributions and causal structures, and detecting GPS spoofing attacks by running the trained DL model and using the causal structures, non-uniform distribution, feature contributions, Shapley attributions, and incorporation of the Shapley attributions and causal structures.

In another aspect of the present disclosure, an electronic device includes one or more processors; and a memory coupled to the one or more processors and storing computer programs that, when being executed, cause the one or more processors to perform providing a trained DL model based on neural networks, feeding GPS signals into the trained DL model, using ASVs to calculate feature contributions, using the ASVs to assign a non-uniform distribution over an ordering of features, obtaining causal structures among the features, applying the ASVs to causal Shapley additive explanation to obtain Shapley attributions, incorporating the Shapley attributions and causal structures, and detecting GPS spoofing attacks by running the trained DL model and using the causal structures, non-uniform distribution, feature contributions, Shapley attributions, and incorporation of the Shapley attributions and causal structures.

In another aspect of the present disclosure, a non-transitory computer readable storage medium contains computer programs. When being executed, the computer programs cause one or more processors of an electronic device to perform providing a trained DL model based on neural networks, feeding GPS signals into the trained DL model, using ASVs to calculate feature contributions, using the ASVs to assign a non-uniform distribution over an ordering of features, obtaining causal structures among the features, applying the ASVs to causal Shapley additive explanation to obtain Shapley attributions, incorporating the Shapley attributions and causal structures, and detecting GPS spoofing attacks by running the trained DL model and using the causal structures, non-uniform distribution, feature contributions, Shapley attributions, and incorporation of the Shapley attributions and causal structures.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings.

Detecting GPS spoofing attacks presents a challenge due to the complex and ever-evolving nature of spoofing techniques. To address this issue, machine learning techniques are used. Machine learning analyzes large volumes of data to extract intricate patterns and representations. Spoofing attacks may be identified through the extracted patterns and representations.

Figure 1:
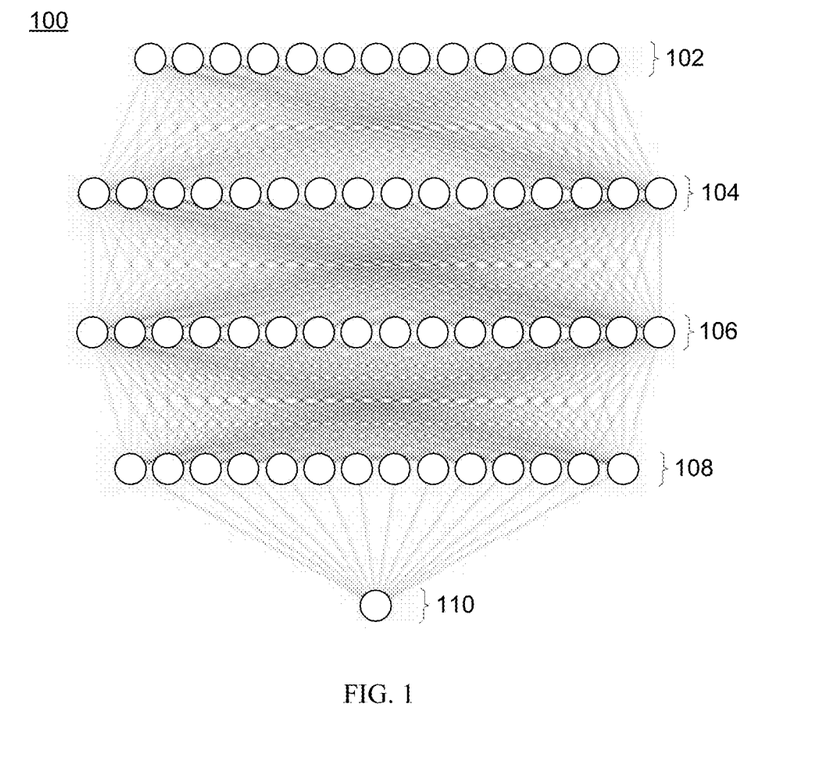
FIG. 1 is a diagram illustrating a deep neural network structure in accordance with various embodiments of the present disclosure.

Deep learning (DL) is a subfield of machine learning. Neural networks make up the backbone of DL algorithms. FIG. 1 shows a diagram of a neural network structure 100 according to the present disclosure. The structure 100 represents a deep neural network or a deep neural network architecture. A deep neural network model may be made based on the structure 100. The structure 100 contains interconnected artificial neurons that are organized into layers. The structure 100 also contains predefined activation functions that connect adjacent layers. The layers include an input layer 102, a first layer 104, a second layer 106, a third layer 108, and an output layer 110. The first to third layers 104-108 are three hidden layers. Optionally, the first and second layers 104 and 106 each have 128 neurons and are respectively followed by a rectified linear unit (ReLU) activation function, while the third layer 108 has 64 neurons and is followed by a hyperbolic tangent (Tanh) activation function. The output layer 110 is a dense layer with a sigmoid activation function.

Data is received at the input layer 102 and undergoes transformation and processing through the hidden layers before an output is generated. The connections between neurons are defined by weights and biases, which are iteratively adjusted during learning processes to optimize performance. The activation functions play a pivotal role by introducing non-linear characteristics to the neural network, and enable it to model intricate relationships between inputs and outputs. The three hidden layers 104-108 correspond to a multi-layer perceptron (MLP) that are used to make predictions (i.e., the output of a trained algorithm).

Besides detecting spoofing signals, it is also important to understand reasons behind signal classification as spoofed. Thus, explainable artificial intelligence (XAI) techniques are incorporated in spoofing detection. By utilizing XAI, valuable insights into the decision-making process of detection models are gained, allowing for a deeper understanding of factors that contribute to signal classification as spoofed.

The XAI method includes the Shapley additive explanation (SHAP), which may be used to analyze reasons behind signal classification as spoofed. For example, SHAP may be used to reveal distinct characteristics exhibited by different types of spoofing attacks, resulting in variations in spoofed signals. However, the SHAP method does not provide causal information when determining SHAP attributions. Without causal relationships, it may hamper the ability to discern the true drivers of spoofing and lead to misinterpretation or ineffective countermeasures.

To address machine-learning based GPS spoofing classification explainability, ASVs are used to calculate feature contributions while incorporating causal structures among feature variables. As used herein, the terms "feature", "variable", and "feature variable" have the same meaning and may be used interchangeably. The Shapley value is a concept in cooperative game theory that provides a method to fairly allocate the total contribution of a group of players to a cooperative game. The Shapley value assigns a unique value to each player in the game based on their marginal contributions. Compared to Shapley values, ASVs provide a technique for incorporating causal knowledge into model-agnostic explainability.

ASV assigns a non-uniform distribution over an ordering in which features are fed to a model, aligning with the underlying causal structure when determining each feature's impact on the model's prediction. By applying ASV to the causal Shapley additive explanation for GPS spoofing detection analysis, more reliable Shapley attributions may be obtained. For example, a specific value may be assigned to each feature, indicating its significance in influencing the model's output while preserving causal relationships among features. As such, a deeper understanding of factors contributing to signal classification as spoofed may be achieved. It may facilitate detecting spoofing attacks efficiently and designing countermeasures effectively.

With the SHAP method, all possible coalitions of players are considered and the marginal contribution of each player when they join or leave a coalition is measured. The SHAP value quantifies the average contribution of a player over all possible permutations of players in the game. By considering different possible orders in which players may contribute, the Shapley value captures the fairness of each player's contribution to the overall outcome of the game.

Assuming a scenario where there are a set of players $X=\{X_1, X_2, \ldots, X_M\}$, and a set function v that assigns real numbers to subsets of players, satisfying the requirement that $v(\emptyset)=0$. The SHAP value, denoted as $\phi_j(v)$, aims to determine a fair share of the total payoff for each player $X_j \in X$.

The computation of the SHAP value involves considering all possible permutations, denoted as $\Pi$, of the players in X. For each permutation $\pi \in \Pi$, the SHAP value of player $X_j$ is computed as follows:

$$\phi_j(v) = \sum_{\pi \in \Pi} \frac{1}{n!} [v(\{j:\pi(j) \le \pi(i)\}) - v(\{j:\pi(j) < \pi(i)\})], \quad (1)$$

where n! represents the factorial of the number of players, and $\pi(j)<\pi(i)$ indicates that player j precedes player i in an ordering defined by permutation $\pi$. The term $v(\{j:\pi(j)\le\pi(i)\})$ represents the value achieved when player $X_j$ joins the coalition before player $X_i$, while $v(\{j:\pi((j)<\pi(i)\})$ represents the value achieved when player $X_j$ joins the coalition strictly before player $X_i$. The difference between these two terms captures the marginal contribution of player $X_j$ when they join the coalition in different orderings.

ASV may be considered as an extension of the classical SHAP value defined in Equation (1). The ASV incorporates a probability measure $w \in \Delta(\Pi)$, where $\Delta(\Pi)$ represents a set of probability measures on the set of permutations $\Pi$. The ASV $\phi_j^w(v)$ is then defined as follows:

$$\phi_j^w(v) = \sum_{\pi \in \Pi} w(\pi) [v(\{j:\pi(j) \le \pi(i)\}) - v(\{j:\pi(j) < \pi(i)\})]. \quad (2)$$

Compared to a classical SHAP value that assigns a uniform probability mass to each permutation, the ASV introduces the probability measure $\omega(\pi)$, which assigns weights to each permutation $\pi$ based on a given probability measure w. ASV introduces the flexibility for an asymmetric treatment of different permutations and enables a more nuanced distribution of contributions among players.

Further, specific choices of the probability measure $\omega(\pi)$ allow for the incorporation of causal information into the explanation. Optionally, a distal approach may be used. The following probability measure is utilized to incorporate causal information.

$$w_{distal}(\pi) \propto \begin{cases} 1 & \pi(i) < \pi(j) \text{ with } i \text{ ancestor of } j \\ 0 & \text{otherwise} \end{cases}$$

In the realm of XAI, both the SHAP and ASV methods aim to assess individual contributions of features in a machine learning model's prediction $f(\cdot)$ for a specific input $x^*=\{x_1^*, x_2^*, \ldots, x_M^*\}$. These methods quantify the impact of each feature by assigning an importance value that reflects their respective contributions. The ASV approach allows for the interpretation and explanation of the model's behavior by attributing significance to each feature based on its role in shaping the model's output.

Certain features are utilized in GPS spoofing attack detection. The features include satellite vehicle number (PRN), carrier Doppler in Hz (DO), pseudo-range in meters (PD), time of the week in seconds (TOW), receiver time in second (RX), carrier phase cycles (CP), magnitude of the prompt correlator (PC), magnitude of the early correlator (EC), magnitude of the late correlator (LC), prompt in-phase correlator (PIP), prompt quadrature component (PQP), carrier Doppler in tracking loop in Hz (TCD), and carrier-to-noise ratio in dB-Hz (C/NO).

PRN is a unique identification number for each of the 27 operational satellites in the GPS constellation. DO is the frequency difference between the transmitted and received GPS signals due to satellite and receiver motion. PD is the time delay between signal transmission and reception, representing the estimated distance between the receiver and satellites. TOW is the number of seconds elapsed since the start of the week according to the satellite's atomic clock. RX is the receiver time in seconds after the start of TOW. CP is the frequency difference between the received carrier signal and a reference frequency, measured in cycles. PC is the measurement of the prompt correlator's magnitude, obtained through correlation using the C/A code. EC is the magnitude of the early correlator positioned half a chip spacing before the prompt correlator. LC is the magnitude of the late correlator positioned half a chip spacing after the prompt correlator. PIP is the in-phase component of the prompt correlator amplitude. PQP is the quadrature component of the prompt correlator amplitude. TCD is the estimated Doppler shift at the tracking loops after passing through a threshold filter. C/NO is the ratio of received carrier strength to noise strength, expressed in decibels per hertz.

Graphical representations of causality offer a visual framework for understanding and modeling causal relationships between variables. These graphs depict causal dependencies and interactions among variables, aiding in the identification of cause-and-effect relationships and facilitating the inference of intervention impacts. By representing variables as nodes and causal relationships as directed edges, these graphical representations enable a systematic analysis of how changes in one variable propagate through the network and influence other variables. Such visualizations prove valuable in identifying confounding factors, comprehending complex causal mechanisms, and informing decision-making processes.

Optionally, the Bayesian structural causal model (SCM) may be employed to construct graphical representations of causal relationships among certain features, such as PRN, DO, PD, etc. The SCM utilizes a Bayesian network (BN), where each directed arc signifies a potential direct causal relationship. It is worth noting that a BN alone, without a causal model, lacks explicit cause-and-effect links and may not facilitate reasoning or prediction involving hypothetical events. In practice, while probabilities reflect beliefs about a static world, causality reveals how these probabilities change when the world is subject to interventions or counterfactual reasoning. The incorporation of imagination and causality is crucial for bridging the gap between artificial and human intelligence.

Figure 2:
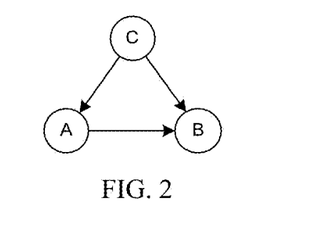
FIG. 2 is a diagram illustrating causal relationships.

FIG. 2 shows a diagram illustrating causal relationships. This is a Bayesian SCM example. As shown in FIG. 2, a node C serves as a common cause of nodes A and B. The node A additionally acts as a cause of B.

A DL model is constructed based on the neural network structure 100. During the training phase of the DL model, a dataset is split into training and testing subsets. For example, division may be done with an 80% allocation for training data and the remaining 20% for testing data. The training data is utilized to train the model's parameters, while the testing data serves as an independent evaluation set to assess the model's performance and generalization ability. It may ensure that the model is trained on a sufficiently large dataset while providing an unbiased assessment of its predictive capabilities on unseen data.

Optionally, four evaluation metrics are utilized to assess and compare the performance of trained DL models: accuracy, sensitivity, specificity, and Fi score. Accuracy measures the overall correctness of the model's predictions. Sensitivity (also known as recall) quantifies the model's ability to correctly identify positive instances. Specificity, on the other hand, measures the model's ability to correctly identify negative instances. The Fi score combines precision and recall, providing a balanced measure of the model's performance. These metrics offer a comprehensive evaluation of the model's predictive capabilities and its ability to handle imbalanced classes.

TABLE I

Deep Learning Model Performance

| Evaluation Metric | Accuracy | Sensitivity | Specificity | $F_1$ Score |
|---|---|---|---|---|
| Value | 0.993 | 0.997 | 0.922 | 0.995 |

Table I presents a comprehensive summary of performance results obtained from the DL model used for GPS spoofing detection. The results indicate that the trained DL model demonstrates a high level of accuracy in detecting spoofed signals. These findings highlight the effectiveness of the deep learning/machine learning approach in accurately identifying and classifying GPS spoofing instances. In descriptions below, two explanation methods, SHAP (without causal information) and ASV (with causal information) will be compared to gain insights into the predictions made by the DL model.

In some cases, observational data are obtained without explicit knowledge of the underlying causal relationships. Although correlations and associations between variables may be observed, the lack of explicit causal information may hinder understanding of how these variables interact and influence each other. For example, in the GPS spoofing detection dataset, there is no prior information about causal relationships among the features. To address this challenge, a causal structural learning algorithm may be used, such as NOTEARS (Non-combinatorial Optimization via Trace Exponential and Augmented lagRangian for Structure learning). The NOTEARS algorithm may facilitate identifying the underlying causal structures.

For example, the NOTEARS algorithm may offer an approach to structure learning. It introduces a new characterization of acyclicity in a graph and formulates the structure learning problem as a continuous optimization problem over real matrices, eliminating the need for combinatorial constraints and enhancing computational efficiency.

Figure 3:
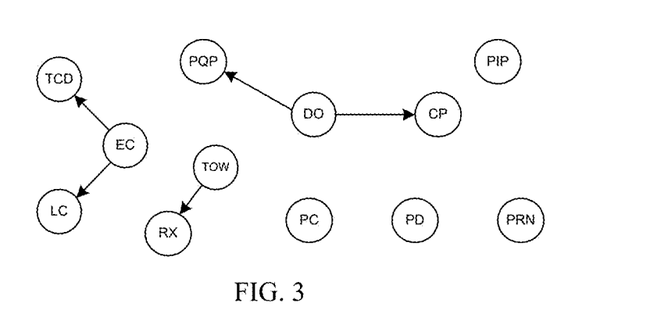
FIG. 3 is a diagram illustrating causal structures of certain features in accordance with various embodiments of the present disclosure.

FIG. 3 shows a diagram illustrating causal structures of certain features in accordance with the present disclosure. The causal structures or causal relationships are obtained from data using the NOTEARS algorithm. As illustrated in FIG. 3, the structural learning algorithm reveals five causal relationships. PC, PD, PRN, and PIP are independent of all other variables, indicating that they are not directly influenced by other features. TOW is a cause of RX. DO is a cause of CP, showing insights into the interplay between the Doppler shift and the frequency difference between the received carrier signal and the reference frequency. The causal structures depicted in FIG. 3 will be incorporated into the computation of SHAP and ASV contributions in descriptions below.

Figure 4:
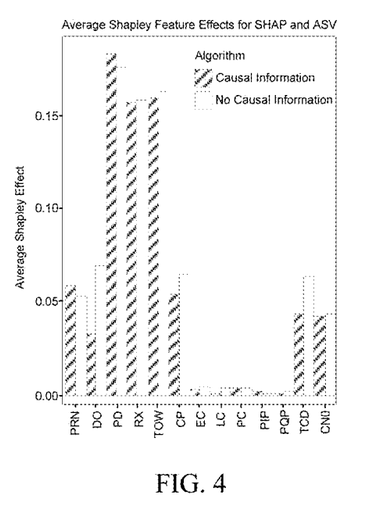
FIG. 4 is a diagram illustrating comparison of averaged Shapley values in accordance with various embodiments of the present disclosure.
Figure 5A:
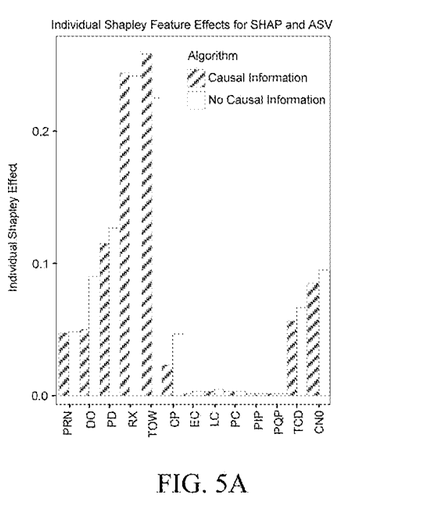
FIGS. 5A-5D are diagrams illustrating comparison of local Shapley values in accordance with various embodiments of the present disclosure.
Figure 5B:
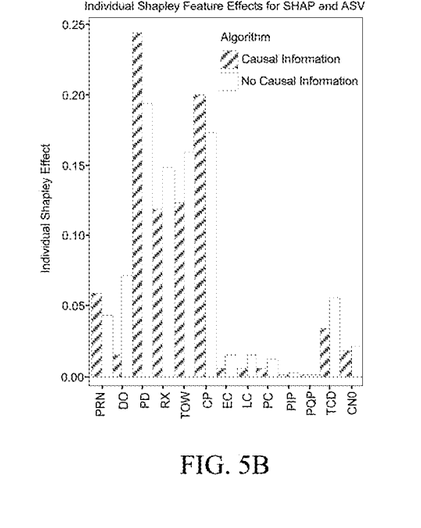
Figure 5C:
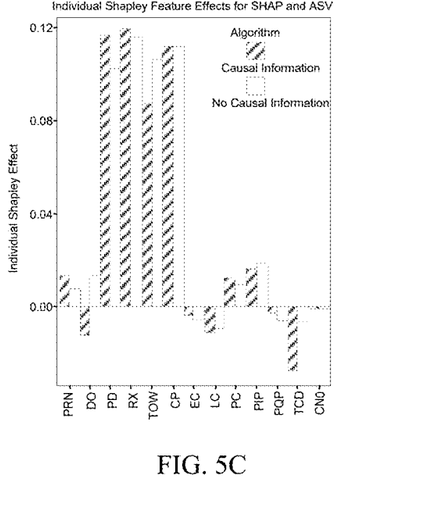
Figure 5D:
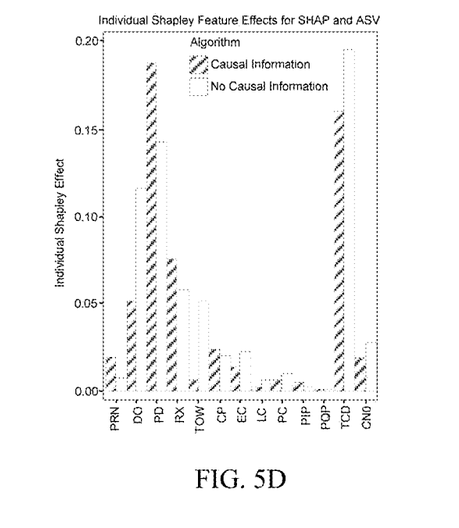

FIG. 4 shows a diagram illustrating comparison of averaged Shapley values in accordance with the present disclosure. The figure presents a comparative analysis of the averaged Shapley values obtained with and without the inclusion of causal information. The evaluation is conducted using, e.g., 50 spoofed signals. The main objective is to determine key contributing features that lead to a signal being classified as spoofed. By focusing on spoofed signals, insights into the specific features are gained that significantly influence the classification outcome. FIG. 4 illustrates that there exist substantial disparities between SHAP values computed using the conventional SHAP method and the ASV approach. For example, the feature DO exhibits a significant discrepancy, with the averaged value obtained using classical SHAP being nearly twice as large as the value obtained using ASV. Furthermore, the SHAP value for the feature TCD is approximately 30% smaller when calculated using ASV compared to that computed using the SHAP.

Although the comparison plots of averaged Shapley values provide valuable insights into the overall effect of incorporating causal information for feature attributions, a more detailed understanding may be obtained by analyzing results on a signal-by-signal basis. By examining the local SHAP value comparisons for individual signals, deeper insights into how the contributions of specific features change may be gained when the causal knowledge is taken into consideration for classifying signals as spoofed or legitimate. The analysis may help obtain more informative and nuanced explanations regarding the influence of features on the classification of each signal.

FIGS. 5A, 5B, 5C, and 5D show diagrams illustrating comparison of local Shapley values in accordance with the present disclosure. These figures present a comparative analysis of the local SHAP values for four spoofed signals. FIGS. 5A-5D correspond to signal No. 1, signal No. 2, signal No. 3, and signal No. 4, respectively. Based on the figures, some results are obtained as follows.

The ASV varies significantly across different signals with the same underlying causal structure. For example, the ASV of TCD for signals No. 1 and No. 2 is approximately 0.05, while for signal No. 4, it reaches around 0.15.

The impact of incorporating causal information into the calculation of SHAP values differs among signals. Take signals No. 1 and No. 2 for example. The SHAP value of DO experiences a decrease of approximately 50% when causal information is included for signal No. 1, whereas for signal No. 2, it shows a nearly 80% drop. Furthermore, the inclusion of causal information may have opposite effects on different signals. For example, for signal No. 1, the Shapley value of PD decreases when the causal information is included, whereas for signal No. 2, it increases.

When the causal information is included, the signs of the Shapley values may vary. For example, the Shapley value of DO for signal No. 3 is positive without considering causal knowledge, but becomes negative when the causal information is taken into account.

Hence, incorporating the causal information is crucial when available. Failing to do so may result in inaccurate interpretations of the SHAP values, leading to false conclusions and ineffective countermeasures. By considering causal structures, a more reliable understanding of feature contributions may be achieved, enabling making informed decisions in the context of spoofing attack detection.

Figure 6:
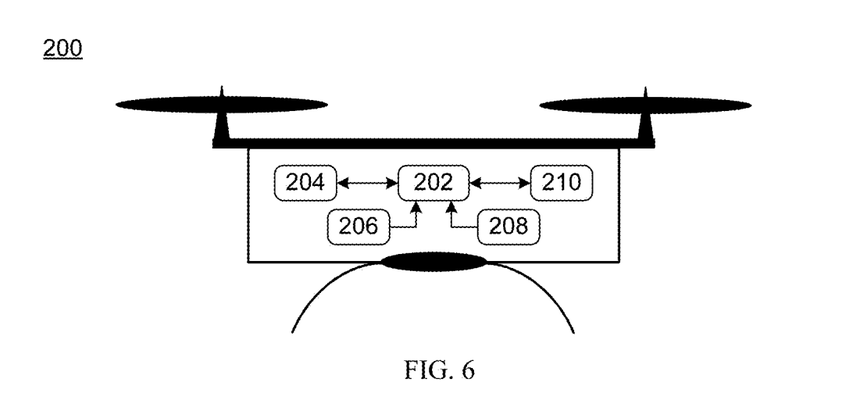
FIG. 6 is a diagram illustrating an exemplary UAV structure in accordance with various embodiments of the present disclosure.

FIG. 6 shows a diagram illustrating an exemplary UAV structure according to the present disclosure. As shown in FIG. 6, a UAV 200 may include a microcontroller unit (MCU) 202, a flight controller 204, a GPS 206, inertial measurement units (IMUs) 208, a communication module 210, an antenna (not shown), and batteries (not shown). The UAV 200 may also include propellers, motors, and other parts that are not annotated in the figure. The MCU 202 contains an onboard chip for data processing. The onboard chip is a processing chip and may have certain functions of a server in some cases. The flight controller 204 is responsible for the stable flight of the UAV 200, usually with predefined waypoint navigation. The GPS 206 is used for localization, and the IMUs 208 (e.g., an electronic compass, a gyroscope, a magnetometer, and/or an accelerometer) are utilized to measure flight dynamics such as pitch, yaw, and roll angles. The communication module 210 is used to establish communication links between the UAV 200 and a ground station, another UAV, or a ground user. The communication links include both command & control and payload communication links.

The GPS 206 is a critical component of the UAV 200. The absolute geolocation, altitude, longitude, latitude, and ground speed may be obtained from GPS data. Any compromise of GPS data affects the flight control and mission completion of the UAV 200.

In some spoofing cases, a GPS-like waveform is transmitted to prevent a receiver of the UAV 200 from tracking authentic GPS satellite signals. The attacks may be applied to the UAV 200 through communication links such as the communication module 210. The most dangerous form of spoofing attack is one that attempts to deceive the receiver and manipulate the critical control messages of the UAV 200. Deceptive spoofing may involve transmitting a similar waveform, intending to trick the GPS receiver into believing that the false signals are actually good ones from GPS sources. Hence, it is desirable to detect GPS spoofing attacks on UAVs.

The trained DL models and ASV algorithm illustrated above may be installed at a ground station to detect GPS spoofing attacks. Alternatively, the trained DL models and ASV algorithm may also be installed at the UAV 200 to detect GPS spoofing attacks on site. For example, the UAV 200 may detect spoofing attacks during a flight mission by itself. In some embodiments, the trained DL models and ASV algorithm may be installed at the onboard chip of the MCU 202 (or another onboard chip) on the UAV 200. The onboard chip may contain one or more processing chips. In some cases, the onboard chip or the MCU 202 may sense spoofing attacks by running the trained DL models and ASV algorithm. The trained DL models and ASV algorithm may be stored at the onboard chip, MCU, or a memory module connected to the onboard chip or MCU 202. GPS data received at the UAV 200 may be transmitted to the onboard chip or MCU 202 via a communication cable. The UAV 200 may be connected with other UAVs that do not have the capability of spoofing attack detection, ascertaining GPS spoofing attacks not only for itself but also for the other UAVs. It may protect a group of UAVs when there is no support of spoofing attack detection from ground stations.

Optionally, a SHAP algorithm may also be stored at the server, onboard chip, or memory module. As such, the trained DL models, ASV, and SHAP may be incorporated to detect GPS spoofing attacks.

Figure 7:
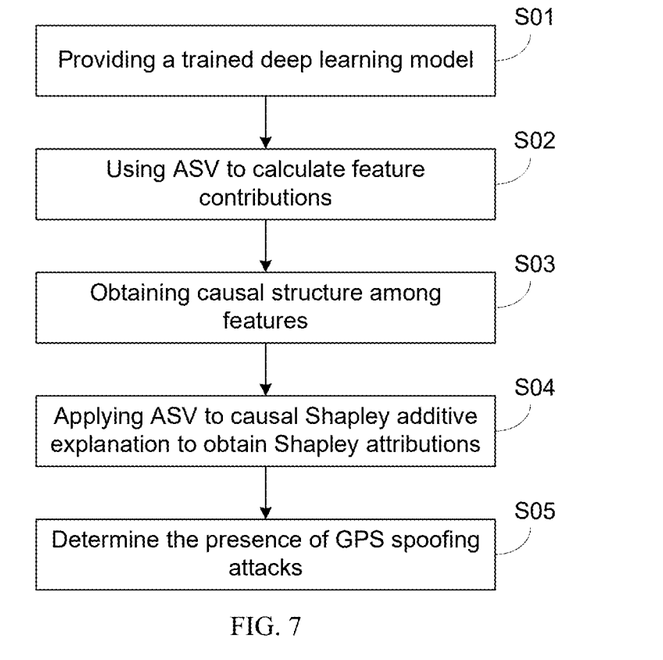
FIG. 7 illustrates an exemplary method for detecting GPS spoofing attacks in accordance with various embodiments of the present disclosure.

FIG. 7 shows a schematic flow chart to illustrate methods for detection of GPS spoofing attacks according to the present disclosure. At S01, a trained DL model (e.g., the above-illustrated trained DL model) is provided. The trained DL model is based on deep neural networks (e.g., the neural network structure 100 shown in FIG. 1). The neural network contains, e.g., three hidden layers. The first two hidden layers are followed by a ReLU activation function, while the third hidden layer is followed by a Tanh activation function. A MLP structure, consisting of the three hidden layers, is used to make predictions. The trained DL model may be installed at a ground station or a UAV and stored at a server of the ground station, a processing chip on the UAV, or a memory module connected to the server or processing chip. The UAV may have a structure similar to that of the UAV 200 shown in FIG. 6. After GPS signals are received at a GPS (e.g., the GPS 206 in FIG. 6), the GPS signals are fed into the trained DL model to detect whether the signals contain any spoofing patterns and representations.

At S02, XAI is utilized to gain insights into the decision-making process of trained DL model. In some cases, the XAI method includes the SHAP method. A SHAP algorithm may be run to analyze reasons behind signal classification as spoofed, such as characteristics associated with different types of spoofing attacks.

Further, an ASV algorithm is run. ASVs are used to calculate feature contributions. The ASV method assigns a non-uniform distribution over an ordering of certain features (e.g., an ordering in which the features are fed to the DL model). Optionally, a specific value may be assigned to each feature, indicating its significance in influencing the DL model's output while preserving causal relationships among the features.

At S03, causal structures among the features or feature variables are obtained. In some cases, a Bayesian SCM may be used to construct graphical representations of causal relationships among the features. Further, a causal structural learning algorithm (e.g., NOTEARS) is used to determine causal structures. As such, not only correlations and associations between features are obtained, but also explicit causal information (e.g., causal structures) among the features becomes known. It facilitates understanding how the features interact and influence each other and may improve detection of spoofing signals.

At S04, ASV is applied to the causal Shapley additive explanation to obtain Shapley attributions for GPS spoofing detection analysis. The Shapley attributions and causal structures among the features are incorporated in the detection.

At S05, the trained DL model is run and the presence of GPS spoofing attacks in the GPS signals is determined. In some cases, ASVs are incorporated by running the ASV algorithm. The spoofing attacks are detected based on results from running the trained DL model and causal information obtained via the ASVs or the ASV algorithm. The causal information may include causal structures, structure equations of SCM, causal relationships among the features, etc. In some embodiments, SHAP and ASV may be incorporated in the spoofing detection. A SHAP algorithm is run to obtain reasons of signal classification. The spoofing attacks are determined based on or using results obtained from running the trained DL model, the causal structures, non-uniform distribution, reasons of signal classification, feature contributions, Shapley attributions, and incorporation of the Shapley attributions and the causal structures.

In some embodiments, an electronic device is used for detecting GPS spoofing attacks. The device may include a server or one or more processors. The trained DL models and ASV algorithm are stored at the server, the one or more processors, or a memory module connected to the server or the one or more processors. Detection of GPS spoofing attacks is performed based on the trained DL models and ASV algorithm and using the above-illustrated methods. For example, certain computer programs may be stored at the memory module. When being executed, the computer programs cause the server or the one or more processors to perform GPS spoofing detection utilizing the methods as described above.

Therefore, as illustrated above, ASV is applied to the causal Shapley additive explanation for GPS spoofing detection analysis. The detection of GPS spoofing attacks is performed by leveraging ASV and causal inference techniques within the realm of XAI. The causal information is incorporated when utilizing XAI methods to comprehend the reasons behind signal classification as spoofed. The inclusion of causal information may yield varying impacts on different signals. With the knowledge of mechanisms behind signal spoofing, it improves detection, analysis, and mitigation of GPS spoofing attacks.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A method for detecting a global positioning system (GPS) spoofing attack, comprising:
   providing a trained deep learning (DL) model based on a neural network;
   feeding a GPS signal into the trained DL model;
   using asymmetric Shapley values (ASVs) to calculate a plurality of feature contributions;
   using the ASVs to assign a non-uniform distribution over an ordering of a plurality of features;
   obtaining a plurality of causal structures among the plurality of features;
   applying the ASVs to causal Shapley additive explanation to obtain a Shapley attribution;
   incorporating the Shapley attribution and the plurality of causal structures;
   using Shapley additive explanation (SHAP) to obtain a reason behind signal classification;
   detecting the GPS spoofing attack by running the trained DL model and using the plurality of causal structures, the non-uniform distribution, the plurality of feature contributions, the Shapley attribution, the reason behind the signal classification, and incorporation of the Shapley attribution and the plurality of causal structures;
   wherein the neural network includes three hidden layers that are followed by a rectified linear unit (ReLU) activation function or a hyperbolic tangent (Tanh) activation function;
   using a Bayesian structural causal model (SCM) to construct a graphical representation of a causal relationship among the plurality of features.

2. The method according to claim 1, further comprising:
   assigning a plurality of values to the plurality of features, respectively.

3. The method according to claim 1, wherein the trained DL model is stored at a processing chip or a memory connected to the processing chip on an unmanned aerial vehicle (UAV).

4. The method according to claim 1, further comprising:
using Non-combinatorial Optimization via Trace Exponential and Augmented lagRangian for Structure learning (NOTEARS) to determine the plurality of causal structures.

5. An electronic device for detecting a global positioning system (GPS) spoofing attack, comprising:
one or more processors; and
a memory coupled to the one or more processors and storing computer programs that, when being executed, cause the one or more processors to perform:
providing a trained deep learning (DL) model based on a neural network;
feeding a GPS signal into the trained DL model;
using asymmetric Shapley values (ASVs) to calculate a plurality of feature contributions;
using the ASVs to assign a non-uniform distribution over an ordering of a plurality of features;
obtaining a plurality of causal structures among the plurality of features;
applying the ASVs to causal Shapley additive explanation to obtain a Shapley attribution;
incorporating the Shapley attribution and the plurality of causal structures;
using Shapley additive explanation (SHAP) to obtain a reason behind signal classification;
detecting the GPS spoofing attack by running the trained DL model and using the plurality of causal structures, the non-uniform distribution, the plurality of feature contributions, the Shapley attribution, the reason behind the signal classification, and incorporation of the Shapley attribution and the plurality of causal structures;
wherein the neural network includes three hidden layers that are followed by a rectified linear unit (ReLU) activation function or a hyperbolic tangent (Tanh) activation function;
using a Bayesian structural causal model (SCM) to construct a graphical representation of a causal relationship among the plurality of features.

6. The device according to claim 5, wherein the one or more processors are further configured to perform:
assigning a plurality of values to the plurality of features, respectively.

7. The device according to claim 5, wherein the trained DL model and ASV algorithm are stored at the one or more processors or the memory and the device is mounted on an unmanned aerial vehicle (UAV).

8. The device according to claim 5, wherein the one or more processors are further configured to perform:
using Non-combinatorial Optimization via Trace Exponential and Augmented lagRangian for Structure learning (NOTEARS) to determine the plurality of causal structures.

9. A non-transitory computer readable storage medium, containing computer programs that, when being executed, cause one or more processors of an electronic device to perform:
providing a trained deep learning (DL) model based on a neural network;
feeding a GPS signal into the trained DL model;
using asymmetric Shapley values (ASVs) to calculate a plurality of feature contributions;
using the ASVs to assign a non-uniform distribution over an ordering of a plurality of features;
obtaining a plurality of causal structures among the plurality of features;
applying the ASVs to causal Shapley additive explanation to obtain a Shapley attribution;
incorporating the Shapley attribution and the plurality of causal structures;
using Shapley additive explanation (SHAP) to obtain a reason behind signal classification;
detecting the GPS spoofing attack by running the trained DL model and using the plurality of causal structures, the non-uniform distribution, the plurality of feature contributions, the Shapley attribution, the reason behind the signal classification, and incorporation of the Shapley attribution and the plurality of causal structures;
wherein the neural network includes three hidden layers that are followed by a rectified linear unit (ReLU) activation function or a hyperbolic tangent (Tanh) activation function;
using a Bayesian structural causal model (SCM) to construct a graphical representation of a causal relationship among the plurality of features.

10. The storage medium according to claim 9, wherein the one or more processors are further configured to perform:
assigning a plurality of values to the plurality of features, respectively.

11. The storage medium according to claim 9, wherein the one or more processors are further configured to perform:
using Non-combinatorial Optimization via Trace Exponential and Augmented lagRangian for Structure learning (NOTEARS) to determine the plurality of causal structures.

* * * * *